United States Patent
Mukawa

[11] Patent Number: 5,693,284
[45] Date of Patent: Dec. 2, 1997

[54] PLASTIC HOLLOW MEMBER AND THE METHOD THEREOF

[75] Inventor: Tatsuhiko Mukawa, Tokyo, Japan

[73] Assignee: Fuji Jukogyo Kabushiki Kaisha, Tokyo, Japan

[21] Appl. No.: 412,340

[22] Filed: Mar. 31, 1995

Related U.S. Application Data

[63] Continuation-in-part of Ser. No. 53,706, Apr. 29, 1993, abandoned.

[30] Foreign Application Priority Data

Jun. 10, 1992 [JP] Japan ..................... 4-175062

[51] Int. Cl.⁶ ..................... B29C 49/22; B29C 45/14
[52] U.S. Cl. ..................... 264/513; 264/279; 264/317
[58] Field of Search ..................... 264/513, 313, 264/317, 250, 271.1, 275, 279; 428/36.91

[56] References Cited

U.S. PATENT DOCUMENTS

| | | | |
|---|---|---|---|
| 3,091,000 | 5/1963 | Makowski | 18/59 |
| 3,561,493 | 2/1971 | Maillard | 264/171.28 |
| 4,940,270 | 7/1990 | Yamazaki et al. | 293/122 |
| 5,013,515 | 5/1991 | Aoki | 264/513 |
| 5,035,983 | 7/1991 | Kiyonari et al. | 430/346 |
| 5,076,329 | 12/1991 | Brunhofer | 138/137 |
| 5,169,590 | 12/1992 | Johnson et al. | 264/513 |
| 5,194,212 | 3/1993 | Bonnett | 264/513 |
| 5,198,174 | 3/1993 | Nakagawa et al. | 264/513 |
| 5,262,113 | 11/1993 | Carmien | 264/271.1 |

FOREIGN PATENT DOCUMENTS

| | | | |
|---|---|---|---|
| 63-141713 | 6/1988 | Japan . | |
| 1-67316 | 3/1989 | Japan . | |
| 3-67056 | 3/1991 | Japan | 264/513 |

*Primary Examiner*—Catherine Timm
*Attorney, Agent, or Firm*—Beveridge, DeGrandi, Weilacher & Young, LLP

[57] ABSTRACT

A hollow plastic member is disclosed suitable for the intake passageway for an automobile engine. A core member is provided formed of multiple layers by blow molding. The core is then used to form the outer layer by injection molding.

6 Claims, 2 Drawing Sheets

PLASTIC HOLLOW MEMBER AND THE METHOD THEREOF

REFERENCE TO A RELATED APPLICATION

This is a continuation in part of my application No. 08/053,706, filed Apr. 29, 1993, now abandoned which is relied on and incorporated herein by reference.

INTRODUCTION AND BACKGROUND OF THE INVENTION

The present invention relates to a plastic hollow member and its use in vehicles such as automobiles, and to a method for the production thereof.

In recent years there has been a tendency for various plastics to be widely used as the material for manufacturing parts for automotive vehicles.

For instance, it is known to make the inlet pipe of the engine by plastic molding.

A hollow plastic member is integrally formed by injection molding around a core member that comprises a hollow inside member and to insert a solid such as sand or glass pieces therein, to prevent a deformation or transformation at the time of injection molding in Japanese Patent Application laid-open Nos. 63-111031 and 63-141713. However, the above mentioned hollow plastic member is limited to two kinds of plastic material because the two-layered structure includes an inside and an outside hollow member. With such structures it is difficult for the hollow plastic member to satisfy requirements for inside smoothness, strength, and gas-barrier properties at the same time.

SUMMARY OF THE INVENTION

An object of the present invention is to provide a hollow plastic member made by a simple process and having few components and parts. A further object of the invention is to provide a hollow plastic member having inside smoothness, strength and sufficient gas-barrier properties.

In order to achieve the above-described objects, there is provided a hollow plastic member, having, as a core member, an inner hollow member formed of multiple layers by blow molding and an outer hollow plastic member integrally formed by injection molding around the core member, to provide a multi-layer plastic hollow member.

Another object of the present invention is to provide a method of producing a hollow plastic member. Therefore, the number of assembling steps can be reduced to a simple process by proving an inner hollow member as a core member.

In order to achieve the above-mentioned objects, the invention resides in a two step method of producing a hollow plastic member which comprises, first forming an inner hollow member with multi resin layer according to blow molding techniques as a core member, and thereafter in a second step injecting plastic resin around the inner hollow member according to injection molding techniques to provide the desired integral hollow member.

In order to further achieve the above-mentioned objects, the method of the present invention for producing the hollow plastic member further comprises forming a non-reinforced resin layer as the inside surface of the inner hollow member and forming a reinforced resin layer as the outside surface of the inner hollow member in accordance with blow molding techniques, so as to provide the desired characteristics of smoothness of the inner surface, sufficient strength, and higher gas-barrier properties.

Therefore, in the injection molding step according to the invention; i.e. the second step, it is not necessary to fill the inner hollow member with solid compressive material such as sand or glass pieces.

The hollow plastic member formed by the present invention is a multi layer structure with three or more layers and possesses a smooth inside surface and is of satisfactory strength with a higher gas barrier characteristic. It functions to prevent the deformation or transformation of the hollow plastic member at the injection molding step.

These and other objects and features of the present invention will become apparent to those skilled in the art from the following description together with the accompanying drawings.

DETAILED DESCRIPTION OF THE PREFERRED EMBODIMENT

The embodiment of the present invention is explained in further detail with reference to the accompanying drawings.

Figure 1:
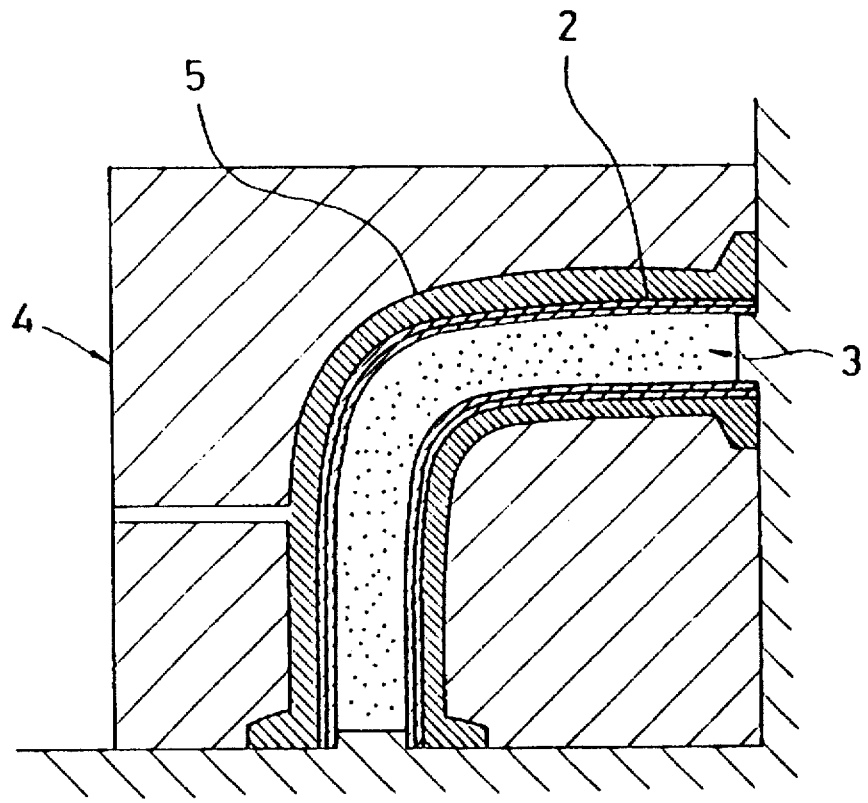
FIG. 1 is a sectional view of a mold for use in injection molding the hollow plastic member of the present invention.

In FIG. 1, there is shown a cross section view of a mold 4, and an elbow shaped inner hollow member 2 filled with non solid particles of sand like material 3. This hollow member serves as a core for the injection molding step. The core need not be filled with anything at the time of the second step in the process of injection molding. An outer hollow member 5 is formed by injecting a resin between the mold 4 and the inner hollow member 2 by an injection molding machine (not shown).

Figure 2:
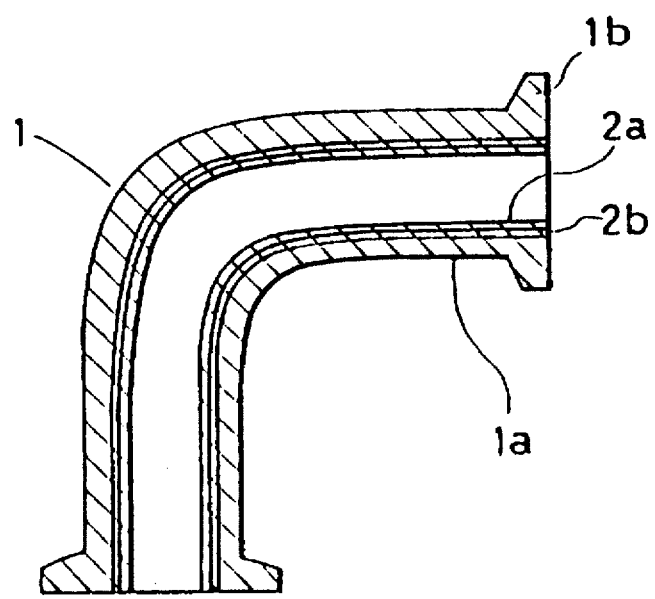
FIG. 2 is a sectional view of the hollow plastic member of the present invention.

In FIG. 2, there is shown in cross section, the final product; i.e., a hollow plastic tube 1 suitable for use as an air intake passageway of an automotive engine. It is integrally formed from the inner hollow member 2 including an inside layer 2a and intermediate layer 2b, and an outside layer 1a with a flange 1b at an each end thereof, respectively.

Figure 3:
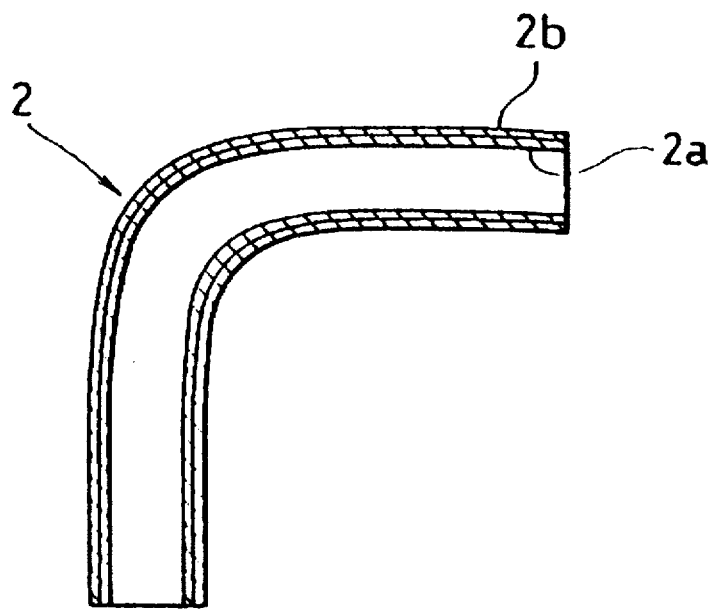
FIG. 3 is a sectional view of an inner hollow member.
Figure 4:
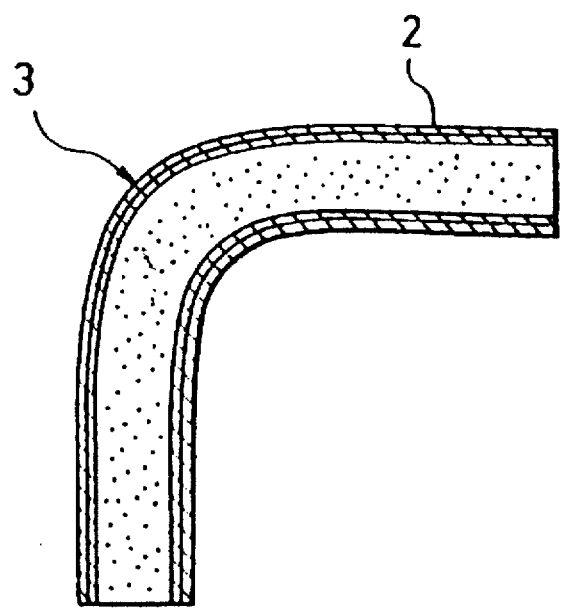
FIG. 4 is a sectional view of a core filling particles of sand like material in the inner hollow member.

In FIG. 3, there is shown a cross section view of the elbow shaped inside hollow tube member 2 formed of a two-layer construction, the outside layer 2b of which is formed of 30% glass fiber reinforced nylon resin and the inside layer 2a is non-reinforced resin. This can be integrally formed by conventional blow molding techniques in the first step of the process.

The core 2 integrally formed of the inner layer 2a and outer layer 2b by blow molding is inserted into the mold 4 and is then ready as shown in FIG. 1 for injection molding. Thereafter the hollow plastic tube 1 is integrally formed with the core 2 by injecting a 45% glass fiber reinforced plastic resin between the core 2 and the mold 4 according to injection molding techniques.

In the present invention, the hollow plastic member 1 is formed to be integral with the inner core by injecting a 45% glass fiber reinforced nylon resin for providing the outer layer 5 around the inside hollow tube 2 as the core including the inner layer 2a of non-reinforced resin and the outer layer 2b of 30% glass fiber reinforced resin.

Therefore, by using the 45% glass reinforced nylon resin for the outer member 5 and integrally forming a three layer structure, the hollow member of this invention is obtained with high gas-barrier properties and highly proof against gases or liquids.

Further, by forming the inner layer 2a from a non-reinforced polyethylene resin, there is obtained a high smoothness for the inner surface 2a which reduces drag, so that it can be used for the intake passage of the automotive engine.

In an another embodiment of the present invention, the inner layer 2a is formed of polyphenylene sulfide (PPS) resin layer with low water absorption, and high rigidity and restriction, so that it is possible to use it in the cooling passage of the engine.

Therefore, in accordance with the present invention, it is possible to select suitable plastic resins according to the gases or liquids passing through the hollow plastic member by using the two step molding process of blow molding and injection molding.

While the presently preferred embodiment of the present invention has been shown and described, it is to be understood that these disclosures are for the purpose of illustrating and various changes and modification may be made without departing from the scope of the invention as set forth in the appended claims.

I claim:

1. A method for producing a three-layered plastic tube which comprises:

forming a two-layered hollow robe member by blow molding, said two-layered hollow tube member having a first thickness and having a reinforced outer layer and a non-reinforced inside layer, said outer layer comprising reinforced glass fiber plastics and said inside layer having a smooth inner surface for reducing fluid flow drag;

allowing said two-layered hollow tube member to harden;

filling said two-layered hollow tube member with core material;

setting said two-layered hollow tube member filled with core material in an injection mold;

injecting a glass fiber reinforced plastic resin between said two-layered hollow tube member and said injection mold to form a layer having a second thickness greater than said first thickness of said two-layered hollow tube member for strengthening said three-layered plastic tube; and producing said three-layered plastic tube after taking out said core material wherein said glass fiber reinforced plastic resin provides barrier characteristics against gases and liquids, said smooth inner surface formed in said two-layered hollow tube member reduces air flow friction therein and said second thickness of said layer of said injected glass fiber reinforced plastic resin provides strength for said three-layered plastic tube.

2. A method of producing a hollow plastic member, the method comprises:

forming a multiple layered inner hollow member by blow molding in a blow mold, said multiple layered inner hollow member having an inside layer of resin and an outer layer formed from a first glass fiber reinforced nylon resin;

removing said multiple layered inner hollow member from said blow mold;

setting said multiple layered inner hollow member in an injection outer mold after said multiple layered inner hollow member is removed from said blow mold;

forming an outer layer covering said multiple layered inner hollow member by injecting a second glass fiber reinforced plastic, which contains more fiber than said first glass fiber reinforced nylon resin, into a layer-forming space defined between said multiple layered inner hollow member and said injection mold to produce said hollow plastic member; and removing said hollow plastic member from said injection mold.

3. The method according to claim 2 wherein said inside layer of resin is polyethylene.

4. The method according to claim 2 wherein said inside layer of resin is polyphenylene sulfide.

5. The method according to claim 2 wherein said first glass reinforced nylon is 30% glass fiber reinforced nylon.

6. The method according to claim 2 wherein said second glass fiber reinforced plastic is 45% glass fiber reinforced nylon.

* * * * *